Nov. 5, 1968    A. L. RAMOS    3,408,911

FILM ADVANCE GRIP

Filed July 19, 1965

INVENTOR.
ARTHUR L. RAMOS
BY
Fryer Tjensvold Feix + Phillips
ATTORNEYS

United States Patent Office 3,408,911
Patented Nov. 5, 1968

3,408,911
FILM ADVANCE GRIP
Arthur L. Ramos, 125 Tamalpais,
San Anselmo, Calif. 94960
Filed July 19, 1965, Ser. No. 472,836
11 Claims. (Cl. 95—86)

ABSTRACT OF THE DISCLOSURE

A twin lens reflex camera grip assembly that is designed to rapidly advance the film and actuate the camera shutter without removing the hand from the grip. A hand grip is rotatably secured to a support member mounted on the camera, and a differential gear mechanism is coupled to the hand grip and adapted to engage and actuate the crank handle of the camera.

---

Figure 1:
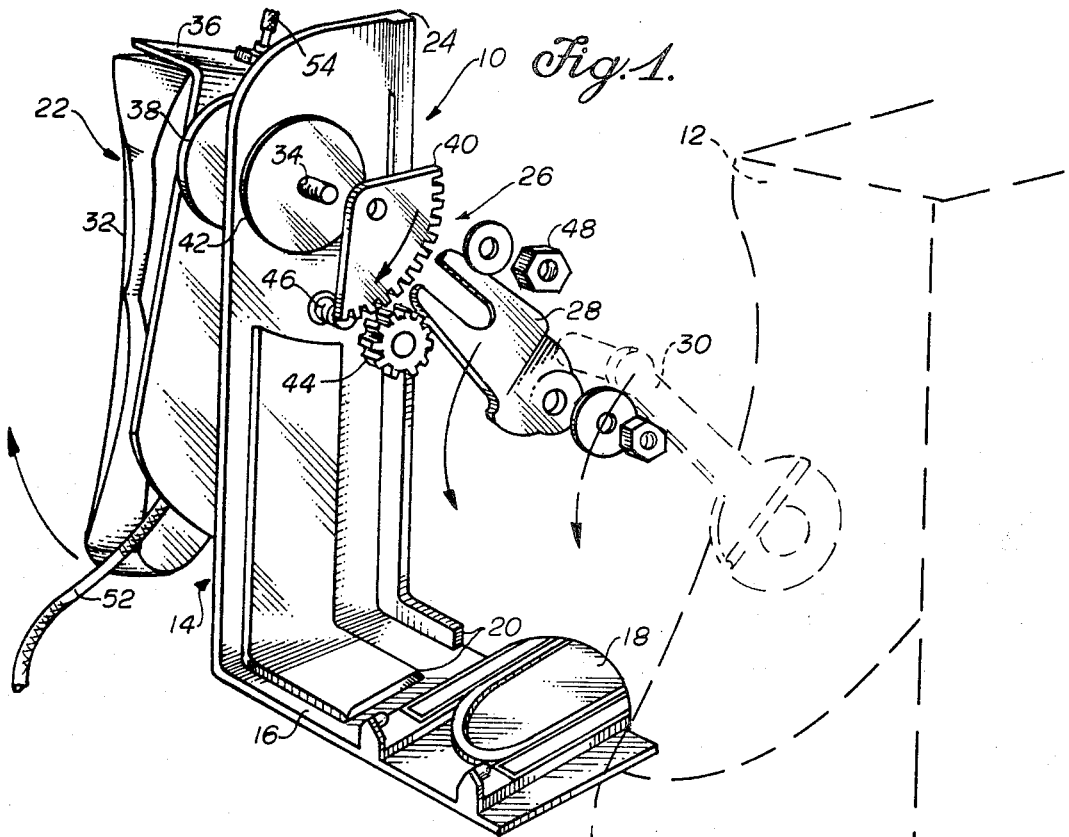

The present invention relates generally to cameras, and more particularly to a high-speed film advance grip assembly for use with twin lens reflex cameras. Although the invention is herein particularly described in conjunction with a twin lens reflex camera made under the trade name of Rolleiflex by a corporation of Germany, it is to be understood that the invention can be utilized with various cameras of the same type having a film advance crank handle located on the side thereof.

There are various means used in twin lens reflex cameras for advancing the film to a succeeding frame after exposure of a preceding frame. The Rolleiflex reflex camera utilizes a typical film advance system employing a crank handle rotatably mounted through the side wall of the camera structure. In order to advance the film within the camera, as well as to cock the shutter for subsequent frame exposure, the crank handle is grasped by a knob secured thereto and is rotated through an angle of approximately 180°. After complete rotation, the handle is returned to its initial position, and the camera is then ready for the next frame exposure.

In the field of commercial photography, it is extremely advantageous to be able to rapidly expose a sequence of film frames, thereby recording a series of pictures of an occurring event with a minimum of delay between frames. However, in order to advance the film of prior art cameras such as the twin lens reflex type of camera, it is necessary for the photographer to release the camera with one hand and to transfer that hand to the crank handle of the camera to rotate same through the above-mentioned substantial angle, generally of the order of 180°. Such action is obviously not only slow and cumbersome, but due to the awkward and excessive motion required, tends to throw the camera out of line with the event beging photographed.

Accordingly, in order to take the next picture, it is necessary for the photographer to relocate the event through the view finder. In addition, prior to taking the next picture the photographer must locate and press the camera shutter release, again necessitating a completely separate and time consuming action. It is thus obvious that it is extremely difficult, if not impossible, to record a rapid sequence of pictures of an occurring event when utilizing this type of reflex camera.

The present invention overcomes the above-noted shortcomings of conventional twin lens reflex cameras by providing a uniquely efficient grip apparatus for use therewith, which apparatus transforms the separate and arduous film-cranking and shutter release-locating motions into a single smooth, rapidly-executed operation which is performed by a twist of the photographer's wrist, without lowering or otherwise removing the camera from the sighting position. Thus, the film can be quickly advanced and the succeeding frames rapidly exposed with a minimum loss of time between frames.

Accordingly, it is an object of the present invention to provide a combination camera grip, film advance and shutter release assembly for a twin lens reflex camera.

It is another object of the invention to provide a film advance grip assembly for use with a twin lens reflex camera to allow operation of the camera without lowering the camera or otherwise disturbing the sighting thereof.

It is still another object of the invention to provide a high-speed film advance grip assembly for use with a camera wherein the operations of sighting the camera, tripping the shutter and advancing the film to the next frame are accomplished without removing the respective hand from the grip assembly.

It is yet another object of the invention to provide a film advance grip assembly whereby the film in a camera is advanced to an unexposed frame merely by a twist of the photographer's wrist through an angle of, for example, 35°.

It is a further object of the invention to provide a high-speed film advance grip assembly for a twin lens reflex camera, which provides for rapidly exposing a series of pictures of an occurring event over a relatively short period of time heretofore unattainable with the conventional camera.

Figure 2:
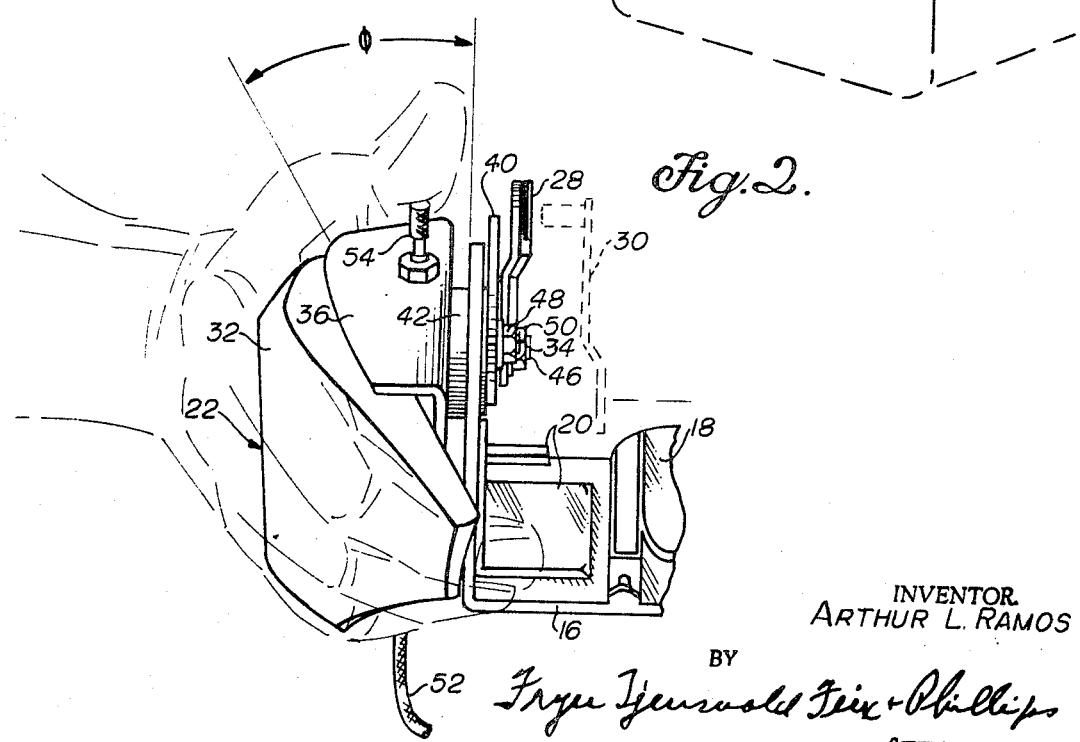

Other objects and advantages will become apparent from the following description taken in conjunction with the accompanying drawing, of which:

FIG. 1 is an exploded perspective view of an exemplifying embodiment of the present invention as utilized with a twin lens reflex camera, and FIG. 2 is a top oblique view of the invention of FIG. 1 in the grip of a photographer.

Referring to the figures, there is shown a high-speed film advance grip assembly 10 attached to a twin lens reflex camera 12. A support member 14 having substantially an L shape provides support for the grip mechanism as well as means by which the invention is demountably secured to the camera 12. For example, a lower portion 16 of member 14 is adapted with a base latch mechanism 18, into which the conventional base of the camera 12 is fitted and locked. Although the support member 14 is herein shown having an L-shaped form, it is to be understood that the member 14 could have any other shape, dependent upon the location of the film advance crank handle and of the base latch, the shape, etc., of the camera upon which the invention is attached. Furthermore, the specific construction of the support member 14 is herein depicted with various reinforcing strips and brackets 20 secured thereto to strengthen same, but which could be dispensed with in the event the member 14 is made with sufficient rigidity and strength.

Hand grip means 22 is rotatably secured to an upper portion 24 of the support member 14, and is adapted to actuate a differential gear assembly 26 coupled thereto. The differential gear assembly 26 is provided with a slotted arm 28 adapted to engage a conventional film advance crank handle 30 of the camera 12.

More particularly, the hand grip means 22 of previous mention has a hand-engaging grip 32, preferably contoured to fit the photographer's hand. A shaft 34 is secured to the upper portion of the grip 32 in perpendicular relation to the plane of rotation thereof. In the embodiment exemplified herein, the shaft 34 is secured to the grip 32 by means of a bracket 36 integrally affixed thereto, but could be affixed directly to a molded handle or grip made of plastic material, for example. A spacer washer 38, which may be fabricated from metal or plastic or may be a composite of metal or plastic and felt to reduce play in the mechanism, is disposed between the grip 32 and the support member 14 to space the grip from the support member to allow the photographer to readily grip the former.

A partial drive gear 40, adapted with teeth about the circumferential periphery thereof, is secured to a threaded end of the shaft 34 which protrudes through the support member 14, and is spaced therefrom by means of a gear spacer washer 42. A driven gear 44, having teeth about the periphery thereof matching those of gear 40, is rotatably secured as by a threaded pin 46 to the member 14, the teeth of gear 40 meshing with those of gear 44. The slotted arm 28 of previous mention, is integrally secured to the outer surface of driven gear 44 as by welding or other suitable means, and is bent slightly outwardly therefrom to provide for engagement with the crank handle 30. The gear 40 and the combination gear 44-arm 28 are secured in place on threaded shaft 34 and pin 46 respectively by means of washers and threaded nuts 48, 50. However, the gears could be otherwise secured to the shaft 34 and pin 46, as for example, by means of lock pins therethrough, or by welding a retaining cap to the ends thereof.

As may be seen from the figures, partial drive gear 40 is relatively larger in diameter than the driven gear 44; the gear ratio being of the order of, for example, 4 to 1 or 5 to 1. By way of example only, gear 40 has about 35 teeth (140 teeth on a projected 360° periphery) and gear 44 has about 30 teeth. Accordingly, rotation of grip 32 and thus drive gear 40 through an angle of about 40° tends to rotate the smaller driven gear 44 and thus arm 28 through an angle of about 180°. Since slotted arm 28 engages the film advance crank handle 30 the latter is likewise driven through an angle of 180°, which in the present instance is the amount of rotation necessary to advance the film in camera 12 one frame. Thus it may be appreciated that a slight and readily effected twist of the photographer's wrist provides a full 180° rotation of the film advance handle 30. It is to be understood that various combinations of gear ratios may be utilized in place of the specific ratio herein set forth, dependent primarily upon the angle through which the crank handle 30 must be rotated, upon the mechanical advantage desired of the differential gear assembly 26, and upon the angle of rotation of hand grip means 22 which is desired.

It will be understood that the shafts 34 and 46 and their attached gears 40 and 44, respectively, are positioned on upper portion 24 of support member 14 such that shaft 46 is essentially coaxial with the center of rotation of lever 30 on the camera body. Thus when arm 28 is rotated through handle-gear rotation, lever 30 is likewise forced to rotate. Any slight misalignment of shaft 46 and the center of rotation of lever 30 will be of no consequence since the lever handle is free to move radially in the slotted end of arm 28.

It is to be noted that the grip 32 is secured to the shaft 34 at an angle herein designated as $\phi$, whereby the photographer may grip the grip 32 with a minimum of wrist angle. Additionally, when the camera is held at eye level while taking photographs, disposing the grip 32 at the angle $\phi$ allows the photographer to twist the grip 32 through the effective angle of rotation with a simple wrist movement with no need for excessive arm and elbow motion. The angle $\phi$ is of the order of about 30°.

To provide for immediate film exposure subsequent to film advance, a shutter actuating, flexible cable 52 having a shutter release trigger or plunger 54, is mounted to grip 32, and in particular to the bracket 36, in such location thereon as to be in position immediately below the photographer's thumb. Shutter release is effected simply by pressing the plunger 54 of the flexible cable 52 with the thumb, which, throughout the film advance operation as well as during the sighting and focusing operation of the camera 12, has never been lifted or otherwise removed from its position against the plunger 54.

Thus the camera 12 may be operated by the photographer in rapid sequence by applying a simple forward and back twist of the grip 32 through a relatively small angle to advance the film, and by then immediately pressing the shutter release plunger 54 under the thumb to expose the film. The operation is repeated in rapid sequence to expose the suceeding frames.

It should be further noted that due to the construction of the present invention, the rotary position of grip means 22 may be varied to suit each individual user's preference. That is, the grips' position within a 360° rotary arc may be shifted by simply disengaging the arm 28 from the camera lever 30. Grip 32 is then rotated until gears 40 and 44 are completely disengaged. Gear 44 and arm 28 are then rotated about pin 46 to any desired angle. Gear 40 is then brought into reengagement with gear 44 whereby grip 22 will assume the desired rotary position. Arm 28 is then engaged with lever 30 on the camera as previously described. When engaged with lever 30, grip means 22 may be freely rotated without fear of disengaging the gears 40 and 44 since the film stop mechanisms built into the camera will automatically limit the rotation thereof. By such operation as described, the rotary position of grip means 22 may be widely varied to suit the desire and comfort of the photographer.

Although the invention has been described herein with respect to a single embodiment, numerous variations could be made thereto without departing from the spirit spirit and scope of the invention. For example, the shutter release cable 52 could be a lever or a button positioned on grip 32 under one of the photographer's fingers rather than under his thumb. Additionally, the grip 32 could be cylindrical or circular in shape, rather than the generally rectangular, contoured shape such as herein depicted. Furthermore, the differential gear assembly 26 could use any of variously known apparatus which would supply the desired substantially positive drive and gear ratio. For example, the flat circular gears 40 and 44 could be replaced with helical gears or with flat or V pulleys of analogous diameters coupled together by means of a flat or V belt. Accordingly, it is not intended to limit the scope of the invention except as defined by the following claims.

What is claimed is:

1. A high-speed film advance grip assembly for use with twin lens reflex cameras of the type having a crank handle on one side thereof for advancing the film therein comprising;
    (a) an L-shaped support member having a base portion and upright arm portion demountably affixed to said camera at the base portion of said support member and having the upright arm portion extending parallel to and spaced from the one side of said camera;
    (b) hand grip means extending parallel to said upright arm portion of the support member and rotatably secured thereto;
    (c) differential gear means mounted on the upright arm portion of said support member and coupled to said hand grip means for actuation thereby;
    (d) arm means secured to said differential gear means and adapted to engage said crank handle of said camera;
    (e) wherein rotation of said hand grip means through a select angle actuates said differential gear means and drives said arm means and thus said camera crank handle through a relatively larger angle than said select angle.

2. The high-speed grip assembly in accordance with claim 1 including shutter release means secured to said hand grip means and coupled in co-acting relation to said camera to allow the exposure of film therein subsequent to operation of said hand grip means.

3. A high-speed film advance grip assembly for use with twin lens reflex cameras of the type having a crank handle for advancing the film therein comprising;
    (a) a support member demountably affixed to said camera;

(b) hand grip means rotatably secured to said support member;
(c) differential gear means mounted to said support member and coupled to said hand grip means for actuation thereby;
(d) said differential gear means comprising first gear means coupled to said hand grip means for rotation thereby, and second gear means rotatably secured to said support member and coupled to said first gear means for rotation thereby;
(e) arm means secured to said second gear means and adapted to engage said crank handle of said camera;
(f) wherein rotation of said hand grip means through a select angle actuates said differential gear means and drives said arm means and thus said camera crank handle through a relatively larger angle than said select angle.

4. The high-speed grip assembly in accordance with claim 3 wherein said arm means comprises an arm member integrally secured at one end to said rotatable second gear means for rotation therewith, the other end thereof having a slot formed therein to engage said crank handle of said camera.

5. The high-speed grip assembly in accordance with claim 4 wherein said first and second gear means comprise toothed circular gears disposed along substantially a common plane with the toothed peripheries thereof in meshing relation.

6. A high-speed grip assembly in accordance with claim 4 wherein said hand grip means further comprises a hand grip, a shaft rotatably mounted to said support member and secured at one end thereof to said hand grip, the other end of said shaft being secured to said first gear means to rotatably drive said first gear means upon application of rotation to said hand grip.

7. A high-speed grip assembly in accordance with claim 6 wherein said hand grip is secured to said shaft at an angle to be thus disposed at a forwardly facing cant to allow readily gripping the hand grip and subsequent rotation thereof with relative ease.

8. A high-speed film advance grip assembly for use with twin lens reflex cameras of the type having a crank handle for sequentially advancing the film therein and a shutter actuated by a shutter trigger the assembly comprising;
(a) a support member demountably affixed to said camera;
(b) a shaft supported by said support member in rotatable relation therewith;
(c) hand grip means secured to one end of said shaft for rotation therewith;
(d) a first toothed partial gear secured to the other end of said shaft;
(e) a second toothed gear rotatably secured to said support member, wherein the teeth of said second gear are disposed in meshing relation to the teeth of said first partial gear, and said second gear is relatively smaller than said first gear;
(f) an arm member integrally secured to said second gear and adapted to rotate therewith, said arm member having a slotted extended end adapted to engage same camera film advance crank handle; and
(g) a shutter release cable having a release plunger and secured to said hand grip means at one end thereof, the other end being coupled to said camera shutter trigger, whereupon rotation of said hand grip means advances said film whereby pressing said release plunger actuates said camera shutter trigger to expose said film.

9. A high-speed grip assembly in accordance with claim 8 wherein the gear ratio between said first gear and said second gear is of the order of from 4:1 to 5:1.

10. A high-speed grip assembly in accordance with claim 8 wherein rotation of said hand grip through an angle of approximately 40° rotatably drives said arm member and thus said camera crank handle through an angle of approximately 180°.

11. A high-speed grip assembly in accordance with claim 8 wherein the rotary position of said hand grip is varied with respect to said support member and said camera by:
(a) disengaging said first toothed partial gear from said second toothed gear;
(b) manually rotating said second gear and integral arm member to a desired position; and
(c) then reengaging said first and second gears, whereby said hand grip is rotatably positioned on said support member.

References Cited
UNITED STATES PATENTS

| | | | |
|---|---|---|---|
| 1,103,418 | 7/1914 | Johnson | 95—86 XR |
| 2,514,991 | 7/1950 | Doyle et al. | 352—179 XR |
| 2,961,937 | 11/1960 | Karpf | 95—86 |
| 3,043,205 | 7/1962 | Kaminski | 95—86 |

NORTON ANSHER, *Primary Examiner.*

JOSEPH F. PETERS, JR., *Assistant Examiner.*